(12) United States Patent
Becher et al.

(10) Patent No.: US 11,598,480 B2
(45) Date of Patent: Mar. 7, 2023

(54) MOUNTING FIXTURE, MOUNTING ASSEMBLY AND METHOD FOR MOUNTING A SENSOR HOUSING TO A SURFACE

(71) Applicant: Turck Inc., Plymouth, MN (US)

(72) Inventors: Dieter Becher, Maple Grove, MN (US); Bruno Gries, Essen (DE)

(73) Assignee: TURCK INC., Indianapolis, IN (US)

( * ) Notice: Subject to any disclaimer, the term of this patent is extended or adjusted under 35 U.S.C. 154(b) by 0 days.

(21) Appl. No.: 16/847,828

(22) Filed: Apr. 14, 2020

(65) Prior Publication Data

US 2021/0317946 A1 Oct. 14, 2021

(51) Int. Cl.
*F16M 13/02* (2006.01)
*F16B 2/06* (2006.01)
*F16B 2/00* (2006.01)

(52) U.S. Cl.
CPC ............ *F16M 13/02* (2013.01); *F16B 2/065* (2013.01); *F16B 2/00* (2013.01)

(58) Field of Classification Search
CPC . F16M 13/02; F16B 2/065; F16B 2/00; F16B 2/02; G01D 13/28; F21S 8/086
See application file for complete search history.

(56) References Cited

U.S. PATENT DOCUMENTS

| 2,622,831 | A | * | 12/1952 | Fullwood | A61G 13/10 248/292.12 |
|---|---|---|---|---|---|
| 4,591,136 | A | * | 5/1986 | Leonard | F16F 1/16 49/386 |
| 5,940,273 | A | * | 8/1999 | Fishman | H01L 23/4006 361/704 |
| 10,190,315 | B2 | * | 1/2019 | Moore | B25B 5/08 |
| 10,968,929 | B2 | * | 4/2021 | Liao | F16B 2/12 |
| 2009/0325769 | A1 | * | 12/2009 | Miskel | A63B 21/0728 482/107 |
| 2016/0314769 | A1 | * | 10/2016 | Liao | F16B 7/0493 |
| 2020/0300279 | A1 | * | 9/2020 | Root | H04W 4/00 |

FOREIGN PATENT DOCUMENTS

CN 107063206 A * 8/2017

* cited by examiner

Primary Examiner — Tan Le
(74) Attorney, Agent, or Firm — Leydig, Voit & Mayer, Ltd.

(57) ABSTRACT

A mounting fixture for mounting a sensor housing to a mounting surface includes: a clamp jaw having a first part and a second part, the first part and the second part of the clamp jaw each including a polygonal recess and being attachable to each other such that a recess of the first part of the clamp jaw and a recess of the second part of the clamp jaw together form an essentially hexagonal recess. The first part and the second part of the clamp jaw are attachable to each other by at least one fastening element so as to fixate the sensor housing in the essentially hexagonal recess. At least one of the first part and second part of the clamp jaw includes a mounting element for mounting the mounting fixture to the mounting surface.

13 Claims, 4 Drawing Sheets

MOUNTING FIXTURE, MOUNTING ASSEMBLY AND METHOD FOR MOUNTING A SENSOR HOUSING TO A SURFACE

FIELD

The invention generally relates to apparatuses, systems, and methods for establishing a mechanical connection between a sensor housing and a surface.

BACKGROUND

In the field of industrial automation various kinds of sensors are used, which are each typically contained in a respective sensor housing. The sensor housings of various sensors often differ in their spatial extensions and shapes. Mounting brackets are commonly available for mounting the sensors and sensor housing, respectively, to the desired object, such as a mounting surface. Typically, each commonly available mounting brackets fit exactly one specific type of sensor housing.

SUMMARY

In an embodiment, the present invention provides a mounting fixture for mounting a sensor housing to a mounting surface, the mounting fixture comprising: a clamp jaw comprising a first part and a second part, the first part and the second part of the clamp jaw each comprising a polygonal recess and being attachable to each other such that a recess of the first part of the clamp jaw and a recess of the second part of the clamp jaw together form an essentially hexagonal recess, wherein the first part and the second part of the clamp jaw are attachable to each other by at least one fastening element so as to fixate the sensor housing in the essentially hexagonal recess, and wherein at least one of the first part and second part of the clamp jaw comprises a mounting element configured to mount the mounting fixture to the mounting surface.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
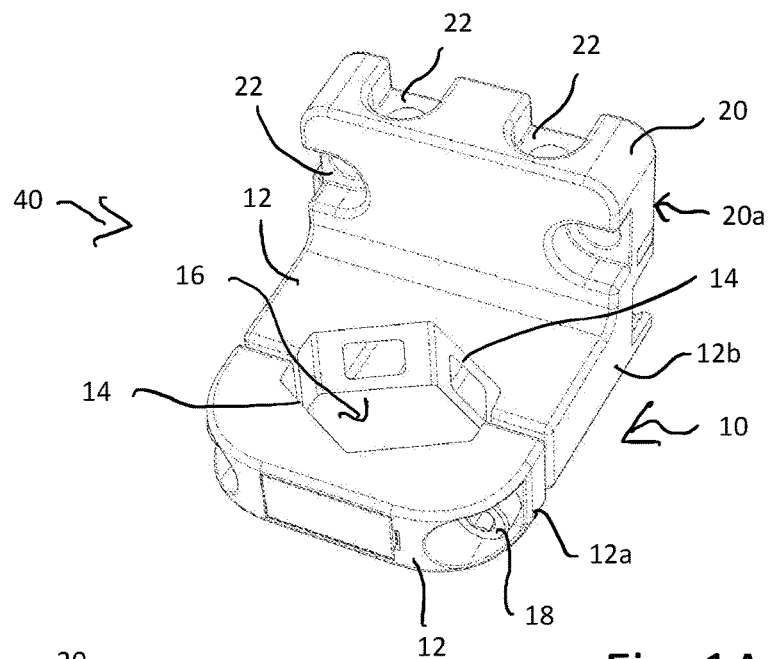
FIGS. 1A to 1C show three different views on a mounting fixture according to an embodiment of the invention.

Embodiments of the invention provide a mounting fixture, a mounting assembly and a method for mounting a sensor housing to a mounting surface.

According to an embodiment, the invention provides a mounting assembly for mounting a sensor housing to a mounting surface. The mounting assembly comprises a clamp jaw comprising a first part and a second part, wherein the first and the second part of the clamp jaw each comprise a polygonal recess and are attachable to each other such that the recesses of the first and the second part of the clamp jaw together form an essentially hexagonal recess. The mounting assembly further comprises at least one fastening element. The first and the second part of the clamp jaw are attachable to each other by the at least one fastening element such as to fixate a sensor housing in the essentially hexagonal recess. The at least one of the first and second part of the clamp jaw comprises a mounting element for mounting the mounting fixture to the mounting surface.

According to another embodiment, the invention provides a method for mounting a sensor housing to a mounting surface. The method includes a step of providing a mounting assembly comprising a clamp jaw, at least one fastening element and at least one fixation element, wherein the clamp jaw comprising a first part and a second part, wherein the first and the second part of the clamp jaw each comprise a polygonal recess and are attachable to each other such that the recesses of the first and the second part of the clamp jaw together form an essentially hexagonal recess; wherein the first and the second part of the clamp jaw are attachable to each other by the at least one fastening element such as to fixate a sensor housing in the essentially hexagonal recess; and wherein the first part of the clamp jaw comprises a mounting element. The method further includes steps of mounting the mounting element of the first part of the clamp jaw to the mounting surface by using the fixation element, and attaching the second part of the clamp jaw to the first part of the clamp jaw such that the recesses of the first and the second part of the clamp jaw together form the essentially hexagonal recess and arranging the sensor housing at least partly within the essentially hexagonal recess. Moreover, the method includes a step of fastening the second part of the clamp jaw to the first part of the clamp jaw such as to fixate a sensor housing in the essentially hexagonal recess.

Embodiments of the invention enable an operator to use one type of mounting fixture and mounting assembly, respectively, for mounting one of various kinds of sensor housings to the housing surface. In other words, embodiments of the invention reduce or eliminate the need of different specific kind of mounting fixture or mounting assembly for each different kind of sensor housing, since the provided mounting fixture or mounting assembly may be used for various types of sensor housings. Consequently, embodiments of the invention allow reducing the number of different kinds of mounting fixtures and mounting assemblies necessary for mounting various different kinds of sensor housings to a mounting surface.

Throughout this document, a mounting fixture relates to a mechanical device for applying a force to a sensor housing in order to keep the sensor housing in place and in order to attach or fix the sensor housing to the mounting surface by means of the mounting fixture. The mounting of the sensor housing by the mounting fixture may optionally be reversible, i.e. optionally the sensor housing may be released from the mounting fixture and the mounting surface, optionally without damaging at least one of the sensor housing and the mounting fixture.

Throughout this document, a mounting surface relates to a mechanical structure, to which a sensor housing may be mounted by using a mounting fixture or mounting assembly. For instance, the mounting surface may represent a plane surface, a curved surface or any other kind of structure or physical item, to which a sensor housing may be mounted.

Throughout this document, a polygonal recess relates to a recess having at least two corners. It is emphasized that the polygonal recess is not necessarily a closed geometrical shape. In other words, the polygonal recess may be open to at least one side. The polygonal shape may in particular comprise two, three, four or more corners.

Throughout this document, an essentially hexagonal recess relates to a recess having a hexagonal shape, wherein the hexagonal shape is not required to represent a perfect hexagon according to a mathematical meaning. Instead, the essential hexagonal shape may deviate from a perfect hexagonal shape, for instance due to manufacturing tolerances. Moreover, the essentially hexagonal recess may deviate from a perfect hexagonal shape, for instance by having an open shape, i.e. not having a closed shape. For instance, the essentially hexagonal shape may be an assembly of two polygonal shapes, which when attached to each other, have the appearance of an essentially hexagonal shape albeit having a gap between the two polygonal recesses of the individual parts of the clamp jaw.

In accordance with an embodiment of the invention, the first and the second part of the clamp jaw each comprise at least one bore hole for receiving the at least one fastening element attaching the first and the second part of the clamp jaw to each other. This allows attaching the first and the second part of the clamp jaw to each other by means of a fixation element extending through the bore holes.

In accordance with an embodiment of the invention, the at least one bore hole for receiving the at least one fastening element is threaded. This allows using a threaded fastening element, such as a screw, for attaching the first and the second part of the clamp jaw to each other.

In accordance with an embodiment of the invention, the first and the second part of the clamp jaw are attachable to each other by at least two fastening elements. This allows increasing the stability of the attachment of the first and second part of the clamp jaw to each other. Furthermore, it increases the stability in terms of rotational movements due to reducing the risk of a rotation with respect of a rotational axis that may be formed by a single fastening element.

In accordance with an embodiment of the invention, the first and the second part of the clamp jaw each comprise at least two bore holes for receiving the at least two fastening elements. This facilitates the attachment by using two or more fastening elements.

In accordance with an embodiment of the invention, the mounting element and the first or the second part of the clamp jaw are formed in one piece. In other words, the mounting element may be a part of the first or the second part of the clamp jaw or vice versa. This allows providing the mounting fixture with a reduced number of pieces, since one of the pieces may serve as the first or second part of the clamp jaw and in addition as the mounting element.

In accordance with an embodiment of the invention, the mounting element and a plane defined by the polygonal recess of the first and second part of the clamp jaw, respectively, are arranged at an angle of more than 0° and less than 180° to each other. In other words, the mounting element and the polygonal recess of the first and second part of the clamp jaw are not arranged and oriented in the same plane. This allows mounting the sensor housing under a predetermined angle with respect to the mounting surface and optionally to mount the sensor housing at a predetermined distance with respect to the mounting surface, which may be determined by the angle and the extension of the mounting element.

In accordance with an embodiment of the invention, the mounting element and a plane defined by the polygonal recess of the first and second part of the clamp jaw, respectively, are arranged at an angle of essentially 90° to each other. In other words, the mounting element and the polygonal recess of the first or second part of the clamp jaw, of which the mounting element may form a part, may be perpendicular to each other. This may allow mounting the sensor housing essentially parallel to the mounting surface due to the essentially hexagonal recess being arranged perpendicular to the mounting element and the sensor housing optionally being fixable perpendicular to the essentially hexagonal recess.

In accordance with an embodiment of the invention, the mounting element comprises at least one bore hole for receiving a fixation element for attaching the mounting element to the mounting surface. This allows the mounting element receiving a fixation element, such as for instance a nail, a screw, a rivet or a similar fastening element, and, thus, may allow a facilitated mounting of the mounting fixture to the mounting surface.

In accordance with an embodiment of the invention, the mounting fixture further comprises at least one engagement member for attaching the mounting fixture to at least one further mounting fixture. This enables the operator to attach several mounting fixtures to each other in a facilitated and precise manner. Optionally, the engagement member comprises an internal dove tail feature for engaging with an external dove tail feature of the further mounting fixture or vice versa. In particular, this configuration allows a tongue and groove fixation of several mounting fixtures to each other and allows a facilitated alignment of the mounting fixtures to each other. These engagement members optionally do not require any further fixation means to attach the mounting fixtures to each other. The engagement member optionally comprises an external dove tail feature for engaging with an internal dove tail feature of the further mounting fixture.

In accordance with an embodiment of the invention, the mounting fixture further comprises at least two engagement members for attaching the mounting fixture to at least one further mounting fixture. This allows connecting more than two mounting fixtures to each other and, thus, enables an operator to provide clusters or rows of mounting fixtures in a facilitated manner. A first of the at least two engagement members optionally comprises an internal dove tail feature and a second of the at least two dove tail features optionally comprises at least an external dove tail feature.

In accordance with an embodiment of the invention, the hexagonal recess of the clamp jaw is arranged such that a first corner of the hexagonal recess is directed directly towards a mounting element surface and a second corner of the hexagonal recess representing the most distant corner of the hexagonal recess from the mounting element surface is directed away from the mounting element surface. The first corner and the second corner of the hexagonal recess are optionally arranged along a straight line perpendicular to the mounting element surface. The mounting element surface is a surface of the mounting element being attachable to the mounting surface. This arrangement of the hexagonal recess allows fixating sensor housings having a variety of different shapes in a reliable and stable manner. In other words, this arrangement of the hexagonal recess with respect to the mounting element surface and, when mounted to the mounting surface, also with respect to the mounting surface, according to which one corner of the hexagonal recess points towards the mounting surface and a second corner is facing away from the mounting surface in an opposite direction, offers a high degree of flexibility with respect to the shapes of the sensor housings, which may be mounted to the mounting surface by using the mounting fixture.

In accordance with an embodiment of the invention, the at least one fastening element is designed as at least one item of a list comprising: a screw, a nail, a rivet and a clamp. This allows a facilitated and cost-efficient manner of attaching the first and second part of the mounting fixture to each other.

In accordance with an embodiment of the invention, the fixation assembly further comprises at least one fixation element for attaching the mounting element to the mounting surface, wherein the fixation element is designed as at least one item of a list comprising: a screw, a nail, a rivet and a clamp. This allows mounting the mounting assembly in an easy and cost-efficient manner to the mounting surface.

In accordance with an embodiment of the invention, the second part of the clamp jaw is fastened to the first part of the clamp jaw such as to exert a clamping force to the sensor housing fixating the sensor housing in the essentially hexagonal recess of the clamp jaw. The essentially hexagonal recess and the fixation by means of the clamping force allows mounting sensor housing of various shapes. The hexagonal surfaces may be particularly suitable for mounting sensor housings having a round or elliptic cross-sectional shape, since the hexagonal recess offers six surfaces for contacting the circumference of the sensor housing and allows applying the clamping force via these six surfaces. This allows an even or regular distribution of the clamping force to the circumference of the sensor housing. An optional use of a gradually tightenable fastener allows gradually applying the clamping force to the sensor housing and, thus, enables an operator to apply a regular and adjustable clamping force for a secure and save fixation of the sensor housing by the mounting fixture or mounting assembly.

Figure 1B:
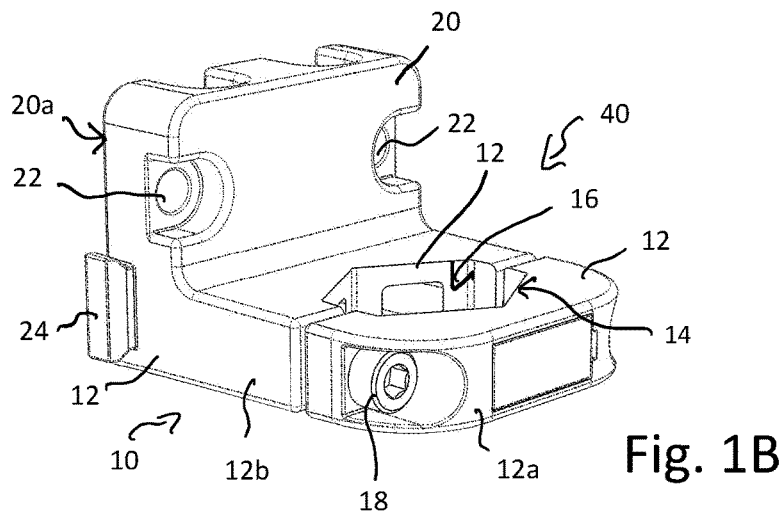
Figure 1C:
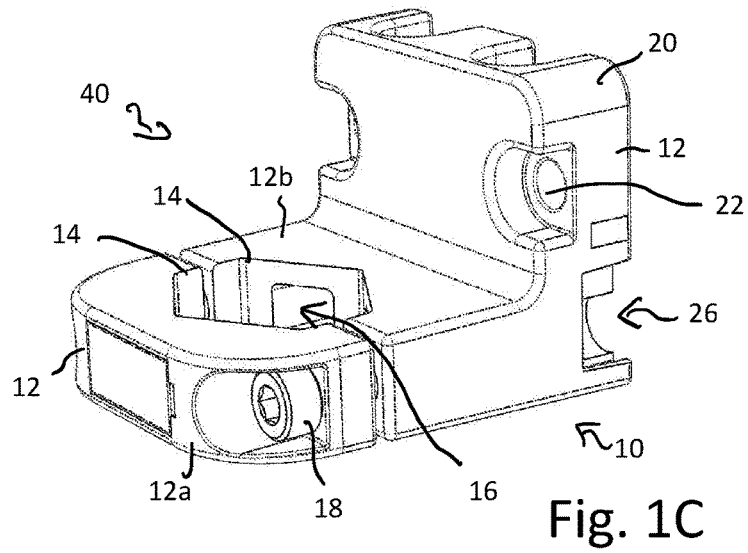

FIGS. 1A to 1C show three different perspective views a mounting fixture 10 according to an embodiment of the invention. The mounting assembly 40 comprising a mounting fixture 10, which comprises a clamp jaw 12 having a first part 12a and a second part 12b. Each part 12a, 12b of the clamp jaw 12 comprises a polygonal recess 14. According to this embodiment, the recess 14 of the first part 12a and second part 12b of the clamp jaw 12 share the same shape, although according to other embodiments their shape may differ from each other. The first part 12a and the second part 12b of the clamp jaw 12 are arranged with respect to each other, such that the recesses 14 together form an essentially hexagonal recess 16. For attaching the first part 12a to the second part 12b of the clamp jaw 12, each part 12a, 12b comprises two bore holes for receiving a fastening element 18, respectively. The bore hole of the first part 12a may be equipped with straight walls, while the bore holes of the second part 12b of the clamp jaw may be equipped with an internal thread for attaching the first part 12a to the second part 12b by means of screws as fastening elements 18. The bore holes are not visible in FIGS. 1A to 1C, due to the fastening elements 18 being covered by the heads of the fastening elements 18.

The second part 12b of the clamp jaw comprises a mounting element 20, which extends from the second part of the clamp jaw 12 in a perpendicular direction, i.e. perpendicular to a plane, in which the essentially hexagonal recess 14 extends. The mounting element 20 allows attaching the mounting fixture 10 to a mounting surface, which may be for instance an even surface. For attaching the mounting fixture 10 to the mounting surface, the mounting element 10 may be arranged to the mounting surface such that a back surface 20a of the mounting element 20 is arranged in direct contact with the mounting surface. Bore holes 22 in the mounting elements allow fixating the mounting element by means of fastening elements to the mounting surface, wherein the bore holes 22 may receive the fastening elements. This might require the mounting surface providing respective holes with or without thread to receive the fastening elements. However, according to other embodiments also other means of fixating the mounting element 20 to the mounting surface may be possible, such as by adhesion.

In addition, the second part 12b of the comprises two complementary engagement members 24 and 26, wherein the first engagement member 24 is formed as an external dove tail feature and the second engagement element 26 is formed as an internal dove tail feature. Multiple mounting fixtures 10 may be attached to each other side by side by engaging one of their engagement members 24, 26 to a complementary engagement member of an adjacent mounting fixture (see FIGS. 3A and 2B).

The mounting assembly 40 according to the presented embodiment comprises the mounting fixture 10 and in addition the two fastening element 18.

Figure 2:
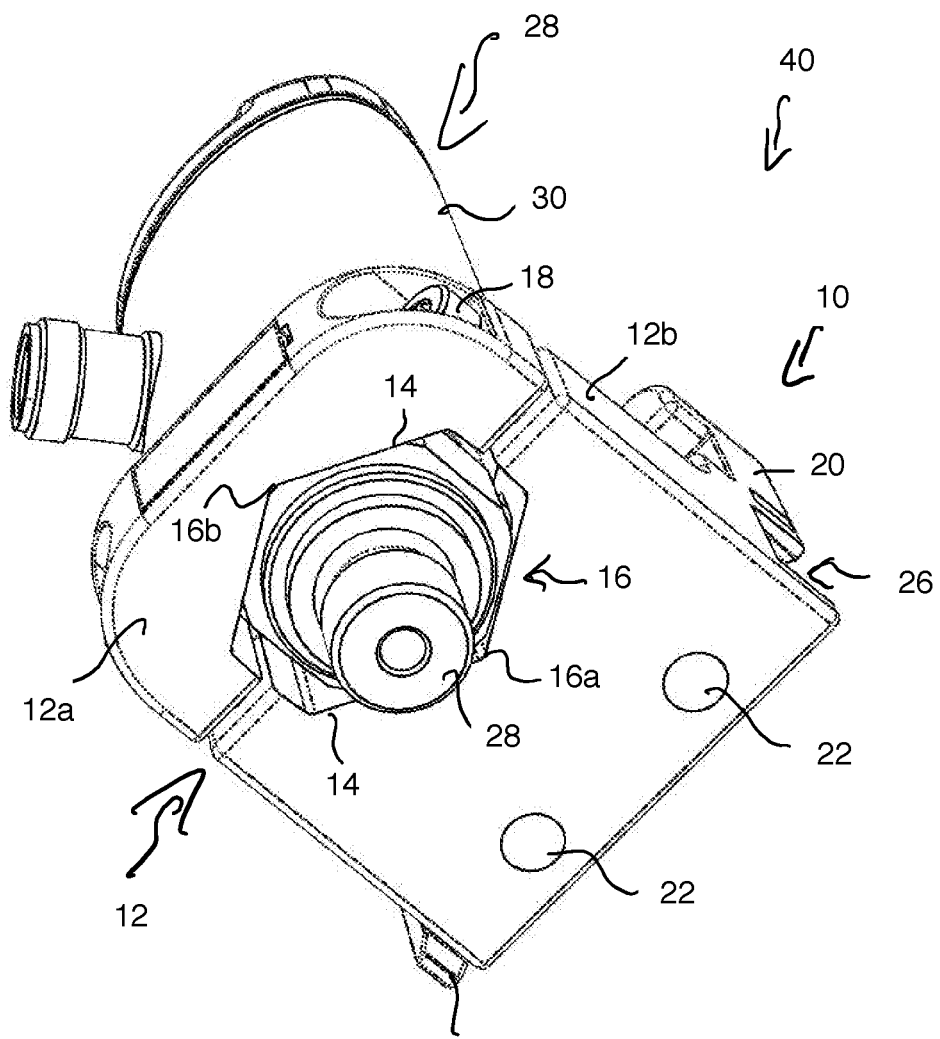
FIG. 2 depicts a mounting assembly according to an embodiment of the invention fixating a sensor.

FIG. 2 depicts a mounting assembly 40 according to the embodiment described with reference to FIGS. 1A to 1C fixating a sensor 28 contained in a sensor housing 30. The mounting fixture is shown in a perspective view from its bottom. As can be seen in FIG. 2, the sensor housing has an elliptical cross sectional shape and is held in the clamp jaw 12 of the mounting fixture 10. Due to the essentially hexagonal shape of the recess 16, the clamp jaw 16 is suitable for a large variety of sizes and shapes of sensor housings 30. The six surfaces of the essentially hexagonal recess 16 offer at least six contact points for applying the clamping force from the clamp jaw 12 to the sensor housing 30. The corner of the essentially hexagonal recess 16 facing the mounting element 20 is directed directly towards the mounting surface and is denoted as the first corner 16a. The opposite corner of the essentially hexagonal recess 16 is denoted as the second corner 16b and is directed away from the mounting surface. The strength of the clamping force applied by the clamp jaw 12 to the sensor housing may be adjusted by fastening the fastening elements 18 with a respective strength to securely hold the sensor housing 30 but not to damage the sensor housing due to an exceedingly high clamping force.

When held in the clamp jaw 12, the sensor 28 may be mounted to the mounting surface by simply mounting the mounting assembly to the mounting surface via the mounting element 20. For doing so, fastening elements may be inserted through the bore holes 22 and engage with the mounting surface. As can be seen in FIGS. 1A to 1C and FIG. 2, respectively, the mounting element 20 comprises two pairs of parallel bore holes 22, wherein one pair of bore holes enables vertical mounting to the mounting surface while the other pair of bore holes enables horizontal mounting of the mounting assembly 40 to the mounting surface.

Figure 3A:
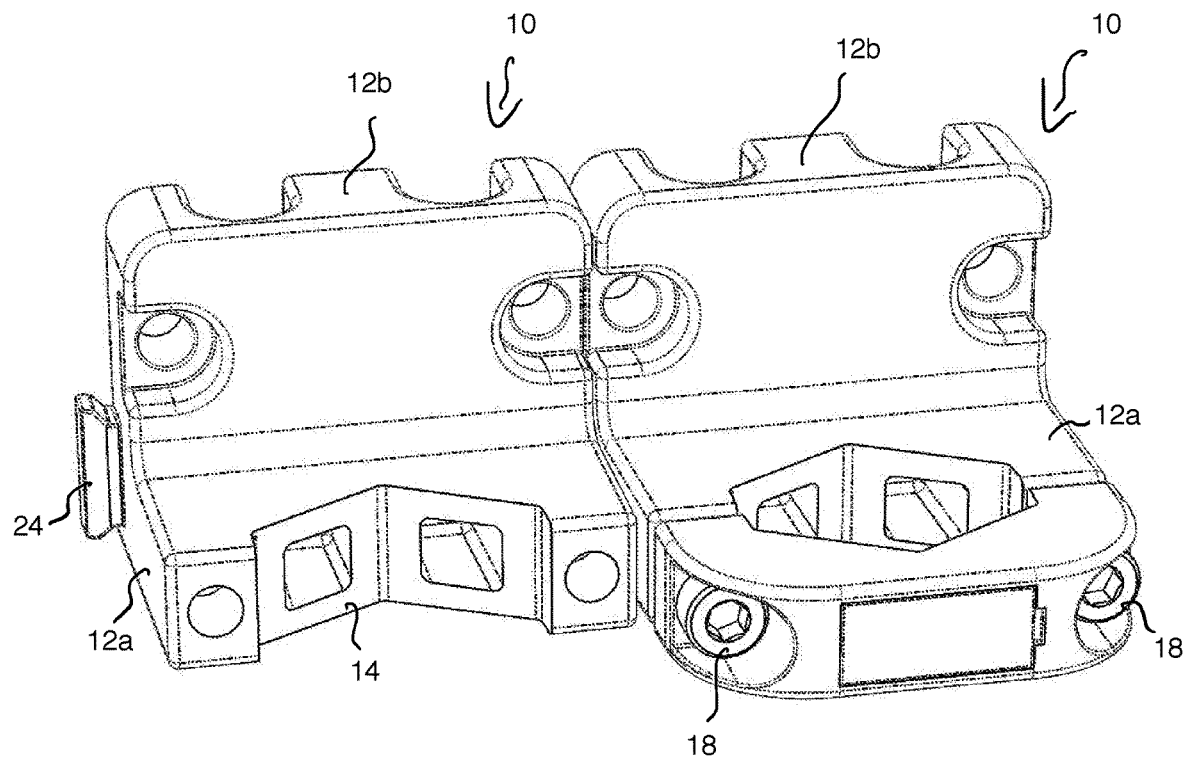
FIGS. 3A and 3B show an assembly of two attached mounting fixtures according to an embodiment of the invention.
Figure 3B:
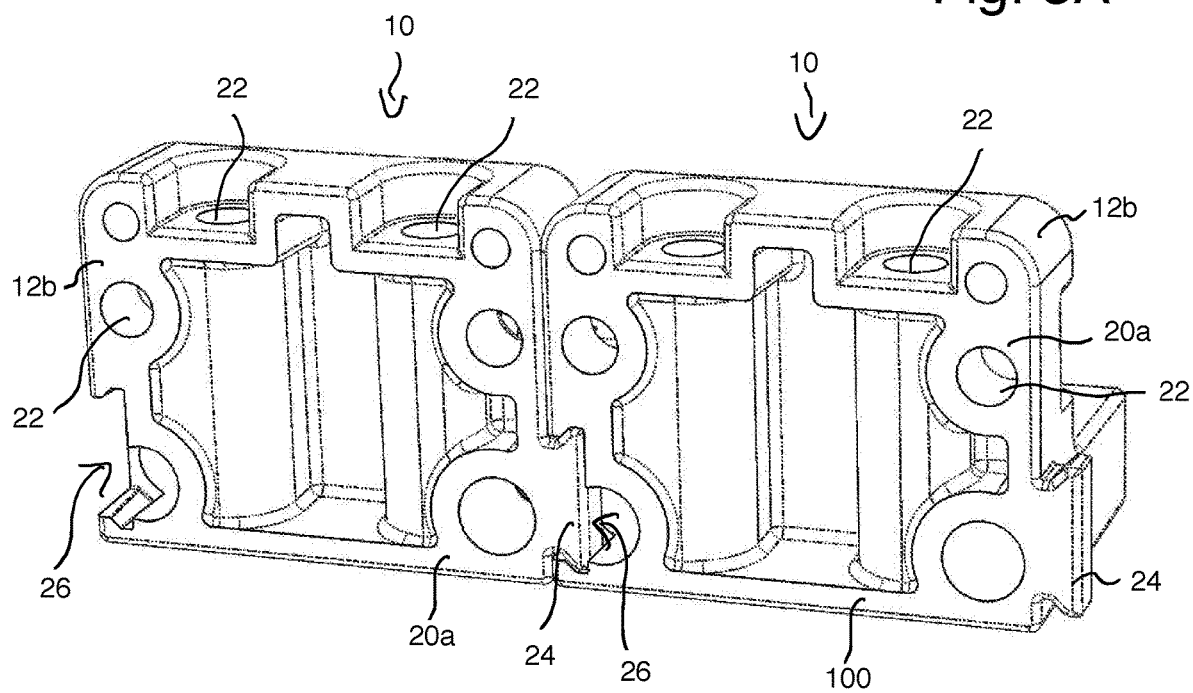

FIGS. 3A and 3B depict an assembly of two mounting fixtures 10 attached to each other via their engagement members 24 and 26. FIG. 3A shows the assembly in front view, FIG. 3B shows the assembly in back view. The left-hand mounting fixture 10 is depicted only by means of the second part 12b of the clamp jaw 12 not showing its first part 12a. As can be seen in particular in FIG. 3B (back view), the mounting fixtures are attached to each other by a tongue-and-groove engagement of two engagement members 24, 26. The engagement members 24 and 24 are formed as external dove tail features (engagement members 24) and internal dove tail feature (engagement member 26), wherein one of each are engaging with each other. This enables an easy and reliable engagement of two or more mounting fixtures with each other to form a row of multiple mounting fixtures 10. On the backside of the mounting fixtures 10 the mounting element surface 100 is indicated (FIG. 3B).

Figure 4:
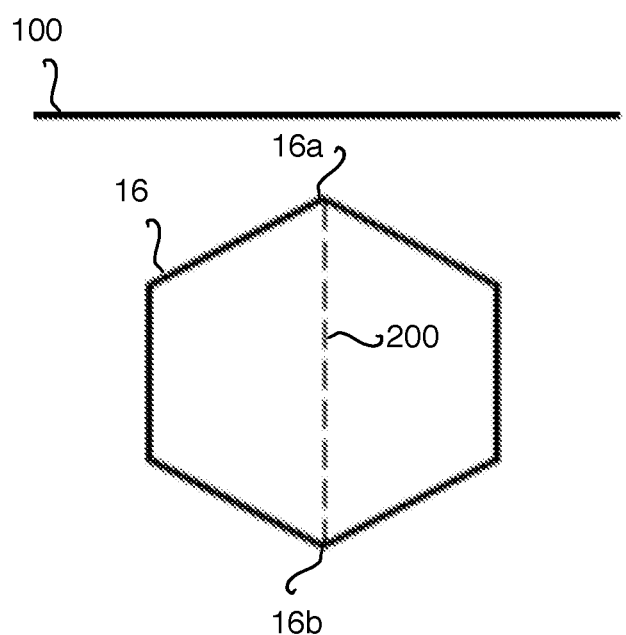
FIG. 4 depicts in a schematic two-dimensional projection view the arrangement of the essentially hexagonal recess according to an embodiment of the invention.

FIG. 4 depicts in a schematic two-dimensional projection view the arrangement of the essentially hexagonal recess 16 with respect to the mounting element surface 100 according to an embodiment of the invention. As can be seen, the essentially hexagonal recess 16 is arranged such that the first corner 16a points directly towards the mounting element surface 100, while the second corner 16b is arranged on the opposite side to be most distant from the mounting element surface 100. The first and the second corner 16a, 16b are located along a straight line 200 being perpendicular to the mounting element surface 100. This arrangement of the essentially hexagonal recess 16 with respect to the mounting element surface 100 and mounting surface allows fixating sensor housing of various different shapes and sizes.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 mounting fixture
12 clamp jaw
12a first part of clamp jaw
12b second part of clamp jaw
14 polygonal recess
16 essentially hexagonal recess
18 fastening element
20 mounting element
20a backside of mounting element
22 bore hole
24 engagement member
26 engagement member
28 sensor
30 sensor housing
40 mounting assembly
100 schematic representation of mounting element surface
200 straight line perpendicular to mounting element surface

What is claimed is:

1. A mounting fixture for mounting a sensor housing to a mounting surface, the mounting fixture comprising:
a first part comprising a first polygonal recess;
a second part comprising a second polygonal recess;
at least one fastening element configured to attach the first part to the second part so as to form a clamp jaw, wherein the first polygonal recess and the second polygonal recess form an essentially hexagonal recess of the clamp jaw for fixating the sensor housing; and
a mounting element configured to attach to the mounting surface,
wherein the mounting element and the second part of the clamp jaw are formed integrally as one piece and serve as one piece, and
wherein a surface of the mounting element and a plane defined by the polygonal recess of the first part and second part of the clamp jaw, respectively, are arranged at an angle of more than 0° and less than 180° relative to each other.

2. The mounting fixture of claim 1, wherein the first part and the second part of the clamp jaw each comprise at least one bore hole configured to receive the at least one fastening element.

3. The mounting element of claim 2, wherein the at least one bore hole is threaded.

4. The mounting fixture of claim 1, wherein the first part and the second part of the clamp jaw are attachable to each other by at least two fastening elements.

5. The mounting fixture of claim 4, wherein the first part and the second part of the clamp jaw each comprise at least two bore holes configured to receive the at least two fastening elements.

6. The mounting fixture of claim 1, wherein the surface of the mounting element and the plane defined by the polygonal recess of the first part and second part of the clamp jaw, respectively, are arranged at an angle of essentially 90° relative to each other.

7. The mounting fixture of claim 1, wherein the mounting element comprises at least one bore hole configured to receive a fixation element configured to attach the mounting element to the mounting surface.

8. The mounting fixture of claim 1, further comprising at least one engagement member configured to attach the mounting fixture to at least one further mounting fixture.

9. The mounting fixture of claim 8, wherein the at least one engagement member comprises an internal dove tail feature configured to engage with an external dove tail feature of the at least one further mounting fixture.

10. The mounting fixture of claim 8, wherein the at least one engagement member comprises an external dove tail feature configured to engage with an internal dove tail feature of the at least one further mounting fixture.

11. The mounting fixture of claim 1, further comprising at least two engagement members configured to attach the mounting fixture to at least one further mounting fixture.

12. The mounting fixture of claim 11, wherein a first of the at least two engagement members comprises an internal dove tail feature, and
wherein a second of the at least two engagement members comprises at least an external dove tail feature.

13. A mounting fixture for mounting a sensor housing to a mounting surface, the mounting fixture comprising:
a clamp jaw comprising a first part and a second part, the first part and the second part of the clamp jaw each comprising a polygonal recess and being attachable to each other such that a recess of the first part of the clamp jaw and a recess of the second part of the clamp jaw together form an essentially hexagonal recess, wherein the first part and the second part of the clamp jaw are attachable to each other by at least one fastening element so as to fixate the sensor housing in the essentially hexagonal recess, wherein at least one of the first part and the second part of the clamp jaw comprises a mounting element configured to mount the mounting fixture to the mounting surface, wherein the mounting element and the first part or the second part of the clamp jaw are formed in one piece, wherein a surface of the mounting element and a plane defined by the polygonal recess of the first part and the second part of the clamp jaw, respectively, are arranged at an angle of essentially 90° relative to each other, and wherein the first part and the second part of the clamp jaw are attachable to each other by at least two fastening elements.

* * * * *